US009915739B2

(12) United States Patent
Benlloch Baviera et al.

(10) Patent No.: US 9,915,739 B2
(45) Date of Patent: Mar. 13, 2018

(54) GAMMA RAY SCINTILLATION DETECTOR PRESERVING THE ORIGINAL SCINTILLATION LIGHT DISTRIBUTION

(71) Applicants: Jose Maria Benlloch Baviera, Valencia (ES); Antonio Javier Gonzalez Martinez, Valencia (ES); Filomeno Sanchez Martinez, Valencia (ES); Cesar Molinos Sonsona, Valencia (ES); Juan Vicente Catret Mascarell, Valencia (ES); Carlos Correcher Salvador, Valencia (ES); Noriel Pavon Hernandez, Valencia (ES)

(72) Inventors: Jose Maria Benlloch Baviera, Valencia (ES); Antonio Javier Gonzalez Martinez, Valencia (ES); Filomeno Sanchez Martinez, Valencia (ES); Cesar Molinos Sonsona, Valencia (ES); Juan Vicente Catret Mascarell, Valencia (ES); Carlos Correcher Salvador, Valencia (ES); Noriel Pavon Hernandez, Valencia (ES)

(73) Assignees: General Equipment for Medical Imaging S.A. (Oncovision), Valencia (ES); Bruker Biospin AG, Fallanden (CH)

( * ) Notice: Subject to any disclaimer, the term of this patent is extended or adjusted under 35 U.S.C. 154(b) by 0 days.

(21) Appl. No.: 14/134,107

(22) Filed: Dec. 19, 2013

(65) Prior Publication Data
US 2014/0175296 A1    Jun. 26, 2014

(30) Foreign Application Priority Data
Dec. 21, 2012    (EP) .................................... 12008547

(51) Int. Cl.
*G01T 1/20*    (2006.01)
(52) U.S. Cl.
CPC .................................. *G01T 1/2002* (2013.01)
(58) Field of Classification Search
CPC .................................. G01T 1/161; G01T 1/20
(Continued)

(56) References Cited

U.S. PATENT DOCUMENTS

| 4,150,292 A | 4/1979 | Ter-Pagossian .......... 250/363 S |
| 6,359,283 B1* | 3/2002 | Gordon ............... H01L 27/1462 250/370.08 |

(Continued)

FOREIGN PATENT DOCUMENTS

| EP | 1 617 237 | 1/2006 |
| JP | H10-73667 | 3/1998 |

(Continued)

OTHER PUBLICATIONS

Barbario et al., Silicon Photo Multipliers Detectors Operating in Geiger Regime : an Unlimited Device for Furture Applications, Jul. 2011, www.intechopen.com, Photodiodes—World Activities in 2011, pp. 215-216.*

(Continued)

*Primary Examiner* — David Porta
*Assistant Examiner* — Mamadou Faye
(74) *Attorney, Agent, or Firm* — Fattibene and Fattibene; Paul A. Fattibene

(57) ABSTRACT

An apparatus to detect gamma rays, comprising a scintillator, a position sensitive photo sensor and a scintillation-light-incidence-angle-constraining, SLIAC, element, the scintillator has faces and the position sensitive photo sensor detects scintillation photons exiting a scintillation photons transparent face of the scintillator, and a portion of a scintillator face is covered with an absorbing layer, which (Continued)

absorbs scintillation photons created by scintillation events due to the interaction of incoming gamma rays with the scintillator, and the SLIAC element is optically coupled between a scintillation photons transparent face of the scintillator and the position sensitive photo sensor and the SLIAC element guides the scintillation photons exiting the scintillator towards the position sensitive photo sensor, and the SLIAC element restricts the maximum allowed half light acceptance angle for the scintillation light hitting the position sensitive photo sensor to less than 45°.

20 Claims, 5 Drawing Sheets

(58) Field of Classification Search
USPC .......................................................... 250/366
See application file for complete search history.

(56) References Cited

U.S. PATENT DOCUMENTS

| | | | |
|---|---|---|---|
| 6,473,486 B2* | 10/2002 | Hoffman | 378/19 |
| 6,516,044 B1 | 2/2003 | Lyons | 378/19 |
| 6,858,847 B1 | 2/2005 | Macciocchi | 250/363.03 |
| 7,476,864 B2 | 1/2009 | Benlloch Baviera et al. | 250/370.11 |
| 7,573,056 B2* | 8/2009 | Nagata et al. | 250/580 |
| 7,696,482 B1* | 4/2010 | Nagarkar et al. | 250/368 |
| 7,964,850 B2* | 6/2011 | Beekman | 250/368 |
| 2003/0021376 A1* | 1/2003 | Smith | 378/98.8 |
| 2004/0227091 A1* | 11/2004 | LeBlanc et al. | 250/366 |
| 2008/0073542 A1 | 3/2008 | Siegel | 250/368 |
| 2009/0266992 A1 | 10/2009 | Beekman | 250/370.09 |
| 2010/0044571 A1 | 2/2010 | Miyaoka et al. | 250/362 |
| 2011/0017911 A1* | 1/2011 | Flamanc et al. | 250/361 R |
| 2011/0017916 A1* | 1/2011 | Schulz et al. | 250/368 |
| 2011/0108733 A1* | 5/2011 | Menge | 250/370.08 |
| 2012/0298876 A1 | 11/2012 | Kaneko et al. | 250/366 |
| 2013/0237818 A1* | 9/2013 | Herrmann | A61B 6/032 600/436 |
| 2013/0306876 A1* | 11/2013 | Uchida | 250/366 |

FOREIGN PATENT DOCUMENTS

| | | |
|---|---|---|
| JP | 2004-340968 | 12/2004 |
| JP | 2012-247281 | 12/2012 |

OTHER PUBLICATIONS

Barbarino et al. (Silicon Photo Multipliers Detectors Operating in Geiger Regime: an Unlimited Device for Furture Applications, Jul. 2011, www.intechopen.com, Photodiodes—World Activities in 2011, pp. 215-216).*

Julio Chaves "Introduction to Nonimaging Optics, 2008, CRC Press, ed. 0, Chap. 2, p. 29".*

Chaves "Introduction to Nonimaging Optics, Chap.2: Design of two Dimensional Concentrators", 2008 Taylor & Francis Group, LLC p. 25-52.*

Sarmah et al., Evaluation and optimization of the optical performance of low-concentrating dielectric compound parabolic concentrator using ray-tracing methods, Jul. 1, 2011, Applied Optics, vol. 50, No. 19, pp. 3303-3310.

Kimiaei et al., Collimator Design for Improved Spatial Resolution in SPECT and Planar Scintigraphy, Aug. 1996, The Journal of Nuclear Medicine, vol. 37, No. 8, pp. 1417-1421.

Japanese Office Action dated Aug. 29, 2017 in corresponding Japanese patent application No. 2013-262322 and English Translation.

* cited by examiner

GAMMA RAY SCINTILLATION DETECTOR PRESERVING THE ORIGINAL SCINTILLATION LIGHT DISTRIBUTION

FIELD OF THE INVENTION

The invention relates to the design of scintillation detectors as used in Nuclear imaging systems like Single-Photon Emission Computed Tomography (SPECT) or Positron Emission Tomography (PET) for the purpose of medical diagnosis.

However it is to be understood that the present invention is also applicable in many other technical fields, as for example in astrophysical gamma ray telescopes or in examining rocks and minerals in geophysics.

BACKGROUND OF THE INVENTION

A wide range of medical image techniques is available for the diagnosis and treatment of diseases. One can differentiate between morphological imaging, such as in Computed Tomography (CT), Magnetic Resonance Imaging (MRI), X-ray, Ultrasound, etc. or functional imaging as in Gamma Ray Radiography, Single-Photon Emission Computed Tomography (SPECT) or Positron Emission Tomography (PET).

Nuclear medicine is a special branch of medicine where physiological processes can be imaged by detecting the radiation from radioactive tracing substances injected into regions of interest (such as organs, bones, tissue, etc.) of the object under examination.

In the case of PET, when the decaying radioactive tracer emits a positron, the positron annihilates with an electron creating a pair of high-energy gamma ray photons which are emitted in opposite directions. To detect the produced gamma rays, in general scintillation crystal detectors are used in the following way.

In the case of PET, when a gamma ray photon enters the crystal it interacts with the atoms of the crystal, creating a flash of isotropically emitted lower energy photons following the excitation or ionization of the crystal atoms. In this so called scintillation event the energy of the gamma ray photons is thus transformed into lower energy (usually visible range) photons, which then can be measured by photo sensors. Furthermore the energy of the lower energy photons is hereby proportional to the energy of the incident gamma ray photons.

When two gamma ray photon detections at opposite locations are made at the same or almost the same time (within a tolerance of a few nano seconds, due to different photon travel distances to the detectors) they are assumed to have been created in the same annihilation process. It is then known that the origin of this gamma ray pair emission must lie on the line connecting the two detection positions. This line is commonly referred to as line of response (LOR, see also US2010/0044571A1). The cross section of a plurality of gamma ray pair detections and LORs can then be used to create a three dimensional map of the region of interest, where the concentration of the radioactive tracers is the highest.

The photo sensors used to measure the scintillation photons are normally position sensitive photomultiplier tubes (PMT) or the recently proposed semiconductor based detectors such as silicon multipliers (SiPM). The SiPMs usually consist of an array of avalanche photo diodes operating in Geiger mode. While SiPMs need less supply voltages than PMTs they suffer from thermal background noise, which increases proportionally to the square root of the covered detector surface area. It is therefore desirable to keep the active SiPM detector area as small as possible, but without reducing the light emitting area of the scintillator.

As mentioned above the energy distribution measured by the photo sensor of such gamma ray cameras is proportional to the energy distribution of the incident gamma ray and so allows to discriminate between the energy of the original incident gamma radiation and secondary radiation such as background radiation or Compton scattered events. Furthermore the detected scintillation light contains information on the spatial location of the scintillation event inside the scintillator and hence on the source of the gamma radiation, the region of interest to be imaged.

Prior art documents U.S. Pat. Nos. 4,150,292 and 6,858,847 are describing embodiments of such detectors in the field of Nuclear Imaging.

It is known that scintillator based gamma ray detectors have a poorer energy resolution than solid state high purity Germanium detectors. However scintillation detectors are still the most common type of detectors used due to their moderate costs, their high efficiency, applicability on large scales and the possibility to operate at room temperatures.

In recent years considerably effort has been put into improving the energy resolution of scintillation detectors by maximizing the collection efficiency of the scintillation light created following the absorption of the gamma ray photons inside the scintillator. Computer simulations and experiments have shown that the ability to capture this light is strongly influenced by the geometry of the scintillator, the coating material of its outer surface and the scintillator-photo detector coupling.

For example a diffuse reflecting optical finish increases the amount of light reaching the photo sensor, whereas using only a specular reflector (i.e. a polished surface) has the opposite effect. The best materials to wrap in light efficient scintillators have a high diffusive reflectivity. Polytetraflouroethylene (PTFE, Teflon) for example is a common material used to coat the outer surface of a scintillator. Recent work US 2011/0017916 A1 shows how to combine a diffuse and specular reflective layer to increase light collection efficiency, however at the expense of worsening the information on the original distribution of the scintillation light. In US 2011/0017916 A1 the objective is to collect all light, regardless of its spatial origin, thereby loosing spatial resolution.

In US 2010/0044571 A1 a photo sensor is mounted onto the scintillator surface of entry of the gamma ray to increase spatial resolution, exploiting the fact that most scintillation events are occurring close to the surface of entry due to the exponential interaction probability. However, such a photo-sensor-on-entrance-surface configuration has the disadvantage that the gamma radiation is attenuated when traversing the photo sensor, which can lead to significant losses at lower energies.

The light distribution of a scintillation event measured by the position sensitive photo sensor, i.e. scintillation light intensity as a function of position on photo sensor depends on the three-dimensional position of the scintillation event inside the scintillator. From the centroid position, the width and higher moments of the light distribution measured by the photo sensor, the original location of the scintillation event can be reconstructed, as shown in EP1617237A1. The accuracy of how well the location of the scintillation event can be determined depends on the dispersion of the scintillation light before reaching the position sensitive photo sensor. In a state-of-the-art scintillator reflections at the scintillator faces increase the light collection efficiency but also lead to a broadening, respectively blurring of the light distribution received by the photo sensor, resulting in less accurate estimates of the three-dimensional scintillation event position, and therefore in a loss of spatial resolution of the gamma ray detector.

Current means of improving the spatial resolution within the field of view of the gamma ray camera commonly only relate to the use of different types of collimators mounted in front of the gamma ray detector in order to filter the gamma rays before the occurrence of a scintillation event (Kimiaei et al., 1996, Journal of Nuclear Medicine, Vol. 37. No. 8, p 1417-1421).

SUMMARY OF THE INVENTION

The objective technical problem to be solved is then to improve a gamma ray scintillation detector, in particular with respect to its spatial resolution.

This said problem is solved by a gamma ray scintillation detector apparatus according to an embodiment of the invention. Preferred embodiments are also disclosed.

An apparatus according to an embodiment has the advantage, that it preserves the original light distribution of the scintillation event photons and hence better constrains the information on the location of scintillation events inside the scintillator to achieve a higher spatial resolution of the gamma ray emitting region, i.e. the region of interest, as compared to the state of the art.

This advantage is achieved thanks to the synergy of two features inherent to the invention.

First the absorbing layer covering (at least a portion of) at least one face of the scintillator reduces internal reflection of the scintillation light, thereby reducing the scintillation light dispersion inside the scintillator and so increases the spatial resolution of the gamma ray detector.

Secondly the use of at least one scintillation-light-incidence-angle-constraining (SLIAC) element such as concentrator(s) and/or faceplate(s) enables to further reduce the internal scintillation light dispersion of the scintillator by restricting the range of allowed incidence angles of scintillation light guided to the position sensitive photo sensor(s) so that in the end a minimal scintillation light dispersion is reached, which would have been impossible to achieve by the use of absorbing layers or SLIACs alone.

A SLIAC element can be for example configured to restrict the view of the position sensitive photo sensor for received scintillation light to maximum scintillation half light acceptance angles of less than 45°, i.e. full (=2×half) light acceptance angles of less than 90°.

The absorbing layer can be of any type which absorbs more than 90%, or at least more than 50% of the incident scintillation photons in the visible energy range, created by the scintillation events due to the interaction of incoming gamma rays with the scintillator. For example it can be black paint or a black epoxy coating.

The absorbing layer may also be provided as a rigid body or as being supported by a rigid body, and which is optically coupled to the face(s) of the scintillator.

For clarity we note that we refer to scintillator faces which are not covered by an absorbing layer, as scintillator faces transparent to scintillation photons, respectively as scintillator faces emitting scintillation photons.

Furthermore, unless noted otherwise, the here exemplary described photo sensors are to be understood as position sensitive photo sensors.

Preferably a face of a scintillator or a portion of it, which is covered with an absorbing layer, is covered by at least 50% of the surface of that face of the scintillator.

Scintillation-light-incidence-angle-constraining (SLIAC) elements such as concentrators and/or faceplates can be optically coupled between the scintillation light emitting face of the scintillator and the photo sensor to guide/channel and/or concentrate the emitted scintillation light onto the photo sensor, increasing the spatial resolution of the gamma ray detector, by restricting the allowed range of the maximum full/half light acceptance angles.

The concentrators can be of any type. For example they can be angle transformer concentrators (TAs), which are characterized by having lateral faces composed of two portions, a parabolic surface and a straight flat surface. However, also compound parabolic concentrators (CPCs), which have the shape of a rotated parabolic section, can be used.

The CPC or the TA concentrators can also be so called adapted concentrators (CPCa, TAa), meaning that they are adapted to specific draft angle and curvature requirements of the fabrication process. The use TAs/TAas can be preferred, since they can possess less cross-talk noise (unwanted light leakage) than CPCs/CPCas when arranged into an array of concentrators.

The use of concentrators as SLIACs also can have the advantage that the photo sensor area can be made smaller then the scintillation light emitting area of the scintillator face and so unwanted thermal noise of the photo sensor can be reduced. Since TAs/TAas can have smaller light exit angles than CPCs/CPCas, using TAs/TAas can permit to use even smaller/more compact photo sensors as in the case of using CPCs/CPCas and thermal noise of the photo sensor can be further minimized.

To allow a dense packing of concentrators, better matching of photo sensor shape and concentrator shape, as well as minimizing dead spaces on the photo sensor, the scintillation light entry and scintillation exit faces of the concentrators can be of rectangular, preferably squared, shape.

In a preferred exemplary arrangement of the invention the geometry of the scintillator in an apparatus according to an embodiment is characterized by having a top base face, which is the face-of-entrance for the gamma rays, a bottom base face opposite to the top base face and a plurality of lateral faces.

Covering more faces or a larger portion of the scintillator with an absorbing layer can reduce the scintillation light dispersion even further and consequently also can further increase the spatial resolution of the gamma ray detector.

Arrangements of the invention, wherein all lateral faces or all faces except the face facing towards the position sensitive photo sensor are covered with an absorbing layer therefore have the advantage that the expected spatial resolution is higher, as compared to scintillators with less faces covered by an absorbing layer.

According to another preferred exemplary arrangement, a gamma ray detector apparatus can comprise a position sensitive photo sensor and concentrators mounted to the scintillator on the face-of-entrance of the gamma rays. This configuration exploits the fact that the most scintillation events occur close to the face-of-entrance of the scintillator, due to the exponential increase of the gamma-ray-scintillator-interaction-probability.

In a further envisioned embodiment position sensitive photo sensors and concentrators are optically coupled to two faces of the scintillator, namely to the face-of-entrance (or top base face) of the gamma rays and to the face opposite the face-of-entrance (or bottom base face). As mentioned above concentrators of any type (i.e. TA, TAs, CPC, CPCa) can be used for each position sensitive photo sensor/position sensitive photo sensor array to concentrate the scintillation light.

As already mentioned above also faceplates as SLIACs can be used for filtering the scintillation light by allowing only scintillation photons with specific incident angles to pass through, and in particular faceplates that can restrict the maximum scintillation half light acceptance angles to less than 45°.

More specifically also faceplates with numerical apertures between 0.58 and 1.00 can be used, thereby further reducing the range of allowed maximum half light acceptance angles for incident scintillation light to between 19° and 34°.

An additional exemplary arrangement of the invention can be a gamma ray detector according to any of the previously described arrangements, wherein the shape of the scintillator is a prismatoid, such as a truncated pyramid.

A truncated pyramidal shaped scintillator has the advantage to enable dense packing of a plurality of gamma ray detectors into ring-like or tube-like configurations useful to enclose an object to be examined. In addition to geometrical considerations, it also reduces scintillator border effects.

The scintillators used in any of the here described examples for embodiments can be mono crystals or pixelated crystals. Preferably the scintillator however is a mono crystal, since pixelated crystals introduce more dead space areas in the gamma ray detector, thus providing less sensitivity of the detector as compared to mono crystals as scintillators.

Alternatively the scintillator material in a preferred exemplary embodiment can also be plastic, ceramic or glass.

The position sensitive photo sensor used in any of the here described exemplary embodiments can be an array of position sensitive photo sensor or a single position sensitive photo sensor covering a scintillation light transparent face of the scintillator, i.e. a face not covered by an absorbing layer. The photo sensor type can be of silicium or silicon based photo multiplier type or of avalanche photo diode type or of any other type sensitive to the position and energy of incident scintillation event photons.

An arrangement of the invention which has the advantage of being more light collection efficient than the other here described embodiments, comprises a retroreflector optically coupled to a scintillation light transparent scintillator face opposite to the scintillation light transparent scintillator face, to which the position sensitive photo sensor and concentrators are optically coupled and wherein at least one of the remaining scintillator faces is covered by an absorbing layer.

Optionally, a faceplate/an additional faceplate or a plurality of faceplates can be optically coupled between the retroreflector and the scintillation light transparent scintillator face, to which the retroreflector is optically coupled to. In other words there can be an additional faceplate or a plurality of faceplates coupled to a scintillation light transparent scintillator face other than the scintillation light transparent scintillator face to which the position sensitive photo sensor is coupled to.

BRIEF DESCRIPTION OF THE DRAWINGS

The following figures serve as exemplary embodiments of the invention.

DETAILED DESCRIPTION OF THE PREFERRED EMBODIMENTS

Figure 1:
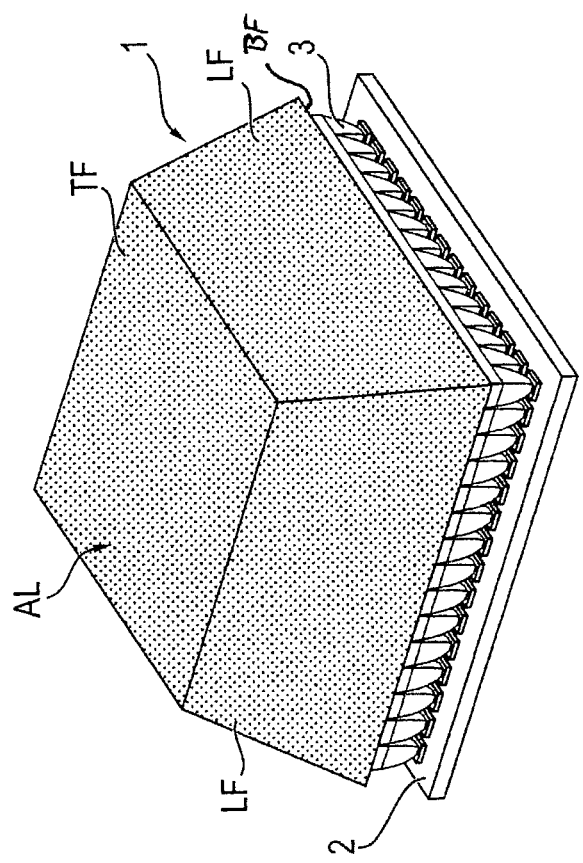
FIG. 1: A gamma ray detector including a scintillator 1, a photo sensor 2, and a scintillation-light-incidence-angle-constraining (SLIAC) element, e.g. concentrator array 3.

FIG. 1 shows an embodiment, wherein the scintillator 1 is a mono crystal having a truncated pyramid shape with all faces except the bottom base face BF (better visible in FIG. 2) covered with an absorbing layer AL and wherein a scintillation-light-incidence-angle-constraining (SLIAC) element, e.g. an array of concentrators 3, is optically coupled to the scintillation light transparent bottom face of the truncated pyramid mono crystal scintillator in order to guide the scintillation light onto a position sensitive photo sensor 2. Two of four lateral faces LF and the top base face TF are visible. The area of the top base face TF is smaller than the area of the bottom base face BF.

At this point, we also like to note that when referring to optic coupling of optical elements, we refer to the use of an optical medium such as silicone, grease or gel, thermal plastic or any other suitable material with a refraction index that reduces internal reflections, especially reflections on the surface of the photo sensor. For example the coupling medium can be a thin layer (with a thickness less than 250 micrometer) of silicone gel with a refraction index between 1.4 and 1.5. However it is also possible that the coupling medium is air.

The absorbing layer(s) may be provided as coating(s) or paint(s) applied individually or all together to the surface(s) of the scintillator. They may also be provided as e.g. a cap or cover or surrounding, which is rigid and optically coupled to the scintillator (or the absorbing layer may be provided as a layer provided on the surface of such a cap, cover or surrounding and being supported thereby). The absorbing layers of different faces of the scintillator may be provided as one layer covering multiple faces or as a plurality of layers each covering (at least a portion) of one face.

In place of the concentrators, which can be of any type as described in the general summary of the invention, also a faceplate/a plurality of faceplates (not shown) could be used to guide the scintillation light onto a position sensitive photo sensor 2.

Furthermore it is possible that at least one faceplate and an array of concentrators may be used together, with for example a faceplate or a plurality of faceplates (not shown) coupled between the array of concentrators (3) and the bottom face BF of the scintillator.

Figure 2:
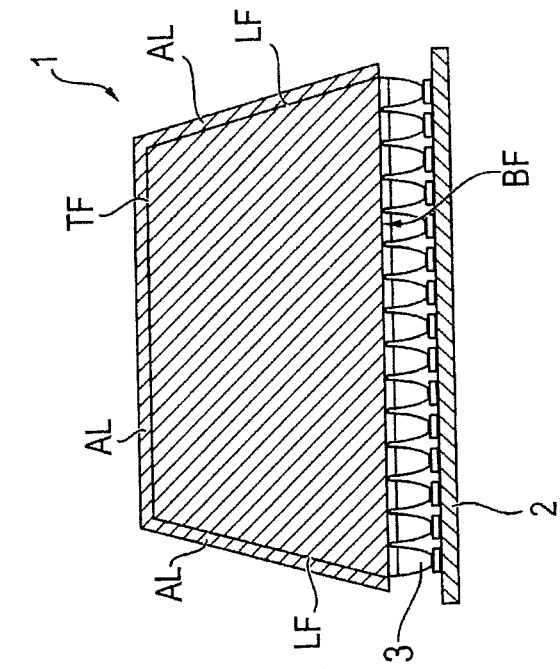
FIG. 2: Transversal view of FIG. 1.

FIG. 2 shows a transversal view of the exemplary embodiment presented in FIG. 1, where one can see that the bottom face BF of the scintillator 1 is not covered by an absorbing layer AL, but that top base face TF and lateral faces LF are and that the position sensitive photo sensor 2 is located below the concentrator array at bottom face, to measure the scintillation photons exiting the scintillator through the bottom face and guided by a scintillation-light-incidence-angle-constraining (SLIAC) element, e.g. the concentrators 3.

An absorbing layer covering a face of the scintillator may be in direct contact with the face or may be optically coupled to such a face.

Figure 3:
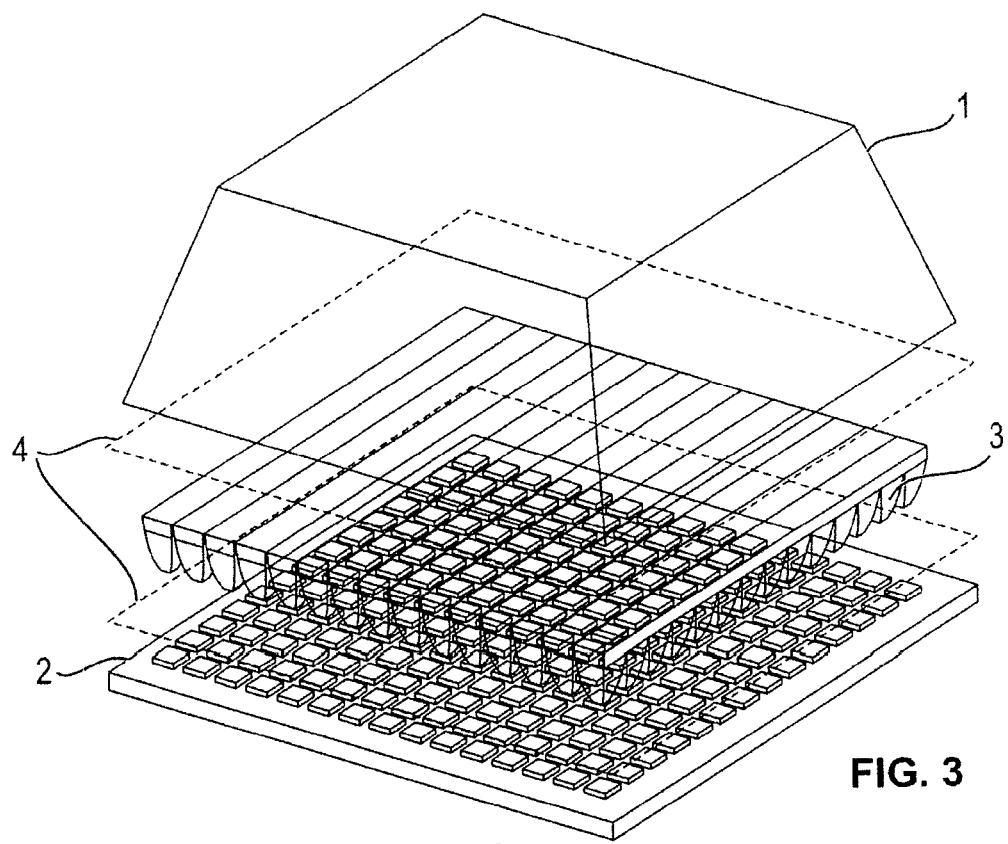
FIG. 3: Exploded view of gamma ray detector of FIG. 1 showing the layers 4 of the optic coupling medium.

FIG. 3 is a transparent exploded view version of the exemplary embodiment shown in FIG. 1 where the optic coupling medium layers 4 between scintillator and concentrators and position sensitive photo sensor and concentrators are shown. This optic coupling medium layers are thin as compared to the thickness of the scintillator, the SLIAC element, e.g. the concentrators 3, or the position sensitive photo sensor 2.

As already mentioned above alternatively or additionally to the concentrators a faceplate/faceplates (not shown) could be optically coupled to a scintillation light transparent face to which a position sensitive photo sensor is optically coupled.

Figure 4:
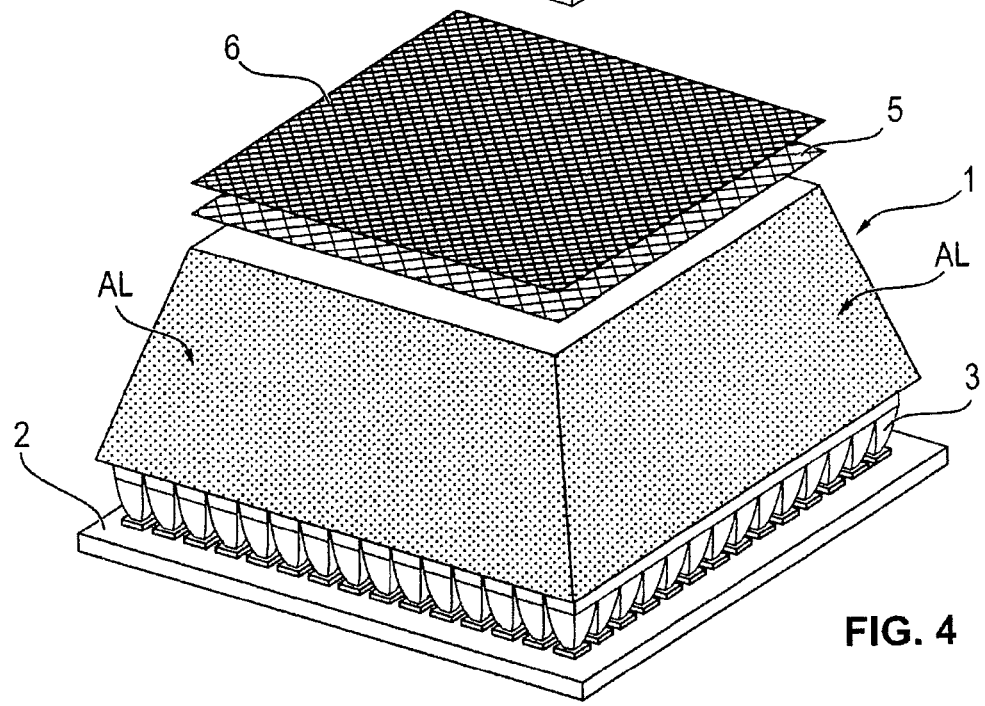
FIG. 4: Partially exploded view of a of gamma ray detector of FIG. 1 with additional faceplate 5 and retroreflector 6.

FIG. 4 shows an exemplary embodiment, wherein top base and bottom face of the scintillator are transparent to scintillation light and wherein the gamma rays enter at the top face and a position sensitive photo sensor 2 (with or without concentrators in front of it) is optically coupled to the bottom face and wherein in addition a faceplate 5 can be optically coupled between the top face and a retroreflector 6. Such an exemplary arrangement has the advantage of increasing the scintillation light collection efficiency as compared to arrangements with all but one face covered by an absorbing layer.

Figure 5A:
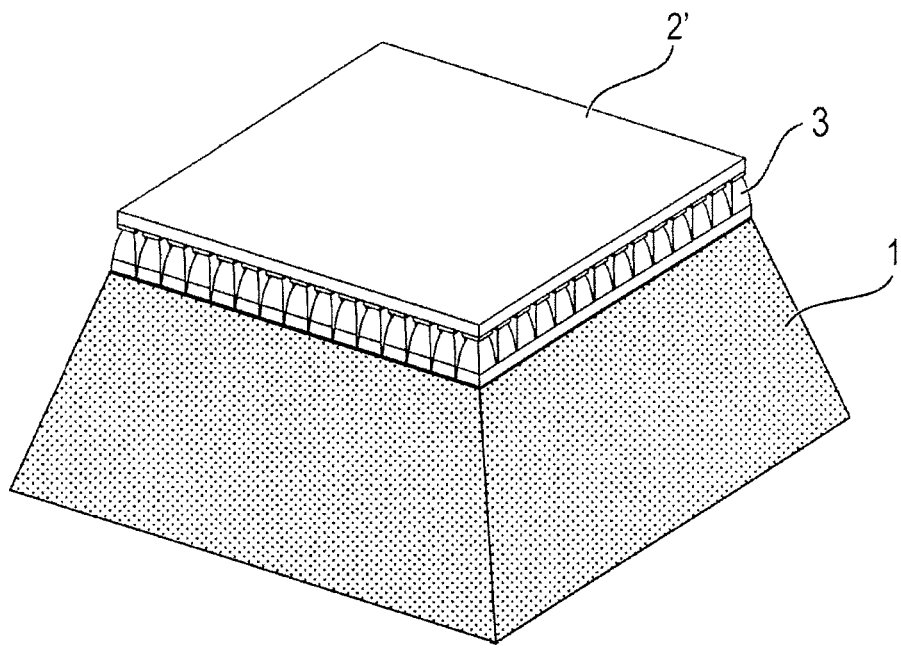
FIG. 5a: Gamma ray detector with photo sensor 2' and concentrators located at the scintillator face-of-entrance of gamma rays.

In a further alternative exemplary embodiment (FIG. 5a), a position sensitive photo sensor 2' is mounted on the top face of truncated pyramid shaped scintillator. Again a scintillation-light-incidence-angle-constraining (SLIAC) element, e.g. an array of concentrators 3 (which can be of type CPC, CPCa, TA, TAa or any other concentrator type) and/or a faceplate/s, can be optionally coupled between said top face and position sensitive photo sensor 2'.

Here for example all scintillator faces except the top face are covered by an absorbing layer.

Figure 5B:
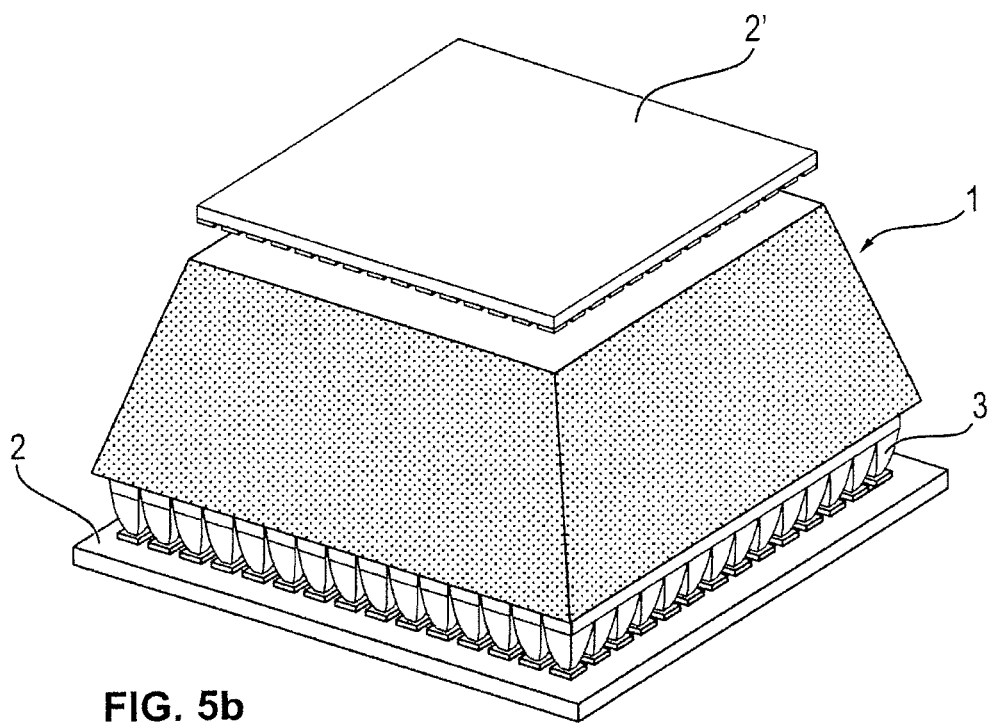
FIG. 5b: Gamma ray detector with a photo sensor 2' mounted to the scintillator face-of-entrance of the gamma rays and a photo sensor 2 and concentrators at the bottom face of the scintillator 1.

FIG. 5b shows an example of an embodiment, wherein a photo sensor 2' is mounted to the top face of the scintillator, the face of entrance of the gamma rays. A further photo sensor 2 and a scintillation-light-incidence-angle-constraining (SLIAC) element, e.g. an array of concentrators 3 (which can be of type CPC, CPCa, TA, TAa or any other concentrator type) and/or a faceplate/s, is attached to the bottom face of the scintillator. Here both top and bottom face of the scintillator are transparent to scintillation light.

Although not shown in the drawing it is further possible that in the configuration of FIG. 5b a second scintillation-light-incidence-angle-constraining (SLIAC) element, e.g. a second array of concentrators and/or a faceplate/s, could be used to guide the light towards the photo sensor 2'.

Also a plurality of gamma ray scintillation detectors according to any of the here described exemplary embodiments can be used to construct gamma ray detector arrays, whose shape is fitted to specific purposes, such as a tube or ring structure used in medical diagnosis.

Figure 6:
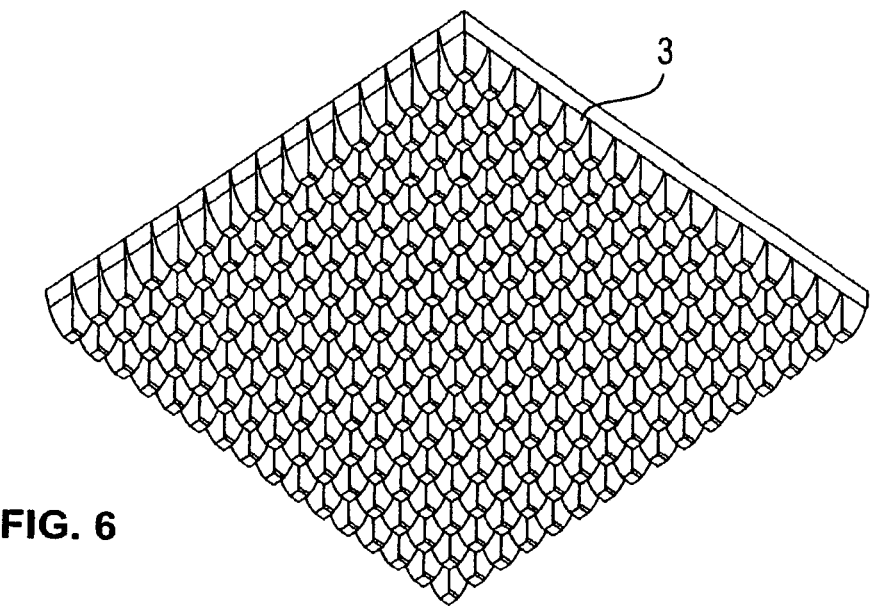
FIG. 6: An array of concentrators.

FIG. 6: Scintillation-light-incidence-angle-constraining (SLIAC) elements, e.g. concentrators and/or faceplates, guiding the light towards a photo sensor can be optically coupled in front of a photo sensor in any of the exemplary arrangements of a gamma ray scintillation detector according to the invention described here. Concentrators can be of type CPC, CPCa, TA or TAa and can be arranged in arrays of various sizes. Shown here for example is a 16×16 array of concentrators 3.

Figure 7:
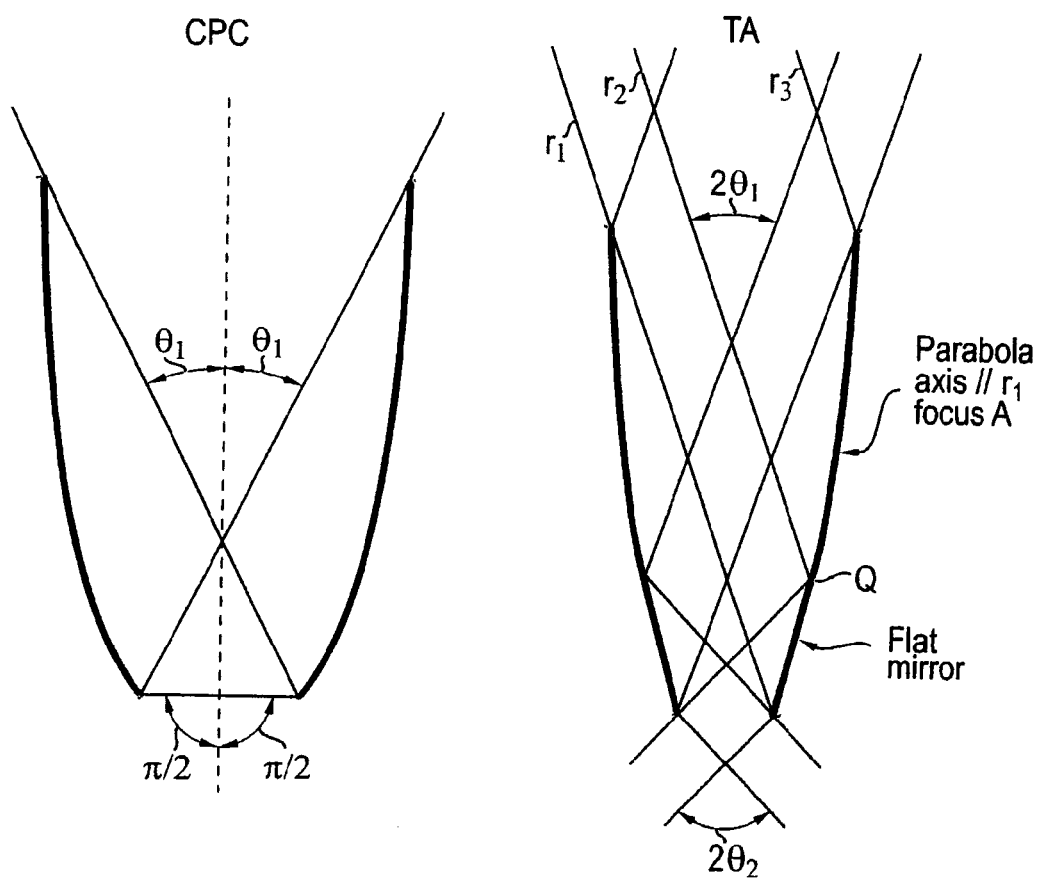
FIG. 7: Transversal views of compound parabolic concentrator (CPC) and angle transformer (TA) concentrator.

FIG. 7: Transversal views are shown of a compound parabolic concentrator (CPC) on the left and an angle transformer (TA) concentrator on the right. Light incidence is from the top and the half light acceptance angles are denoted by $\Theta_1$ and half light exit angles are denoted by $\Theta_2$.

In fact in the shown light path geometries, said half light acceptance angles are the maximum half light acceptance angles.

For completeness we note that a full light acceptance angle is two times its half light acceptance angle. The half exit angle of the CPC is $\pi/2$ whereas the half exit angle of the TA is less than $\pi/2$. The TA is characterized by having sides composed of a parabola DQ and a flat mirror QB. Exemplary light paths for the TA are denoted with r1, r2 and r3.

Figure 8:
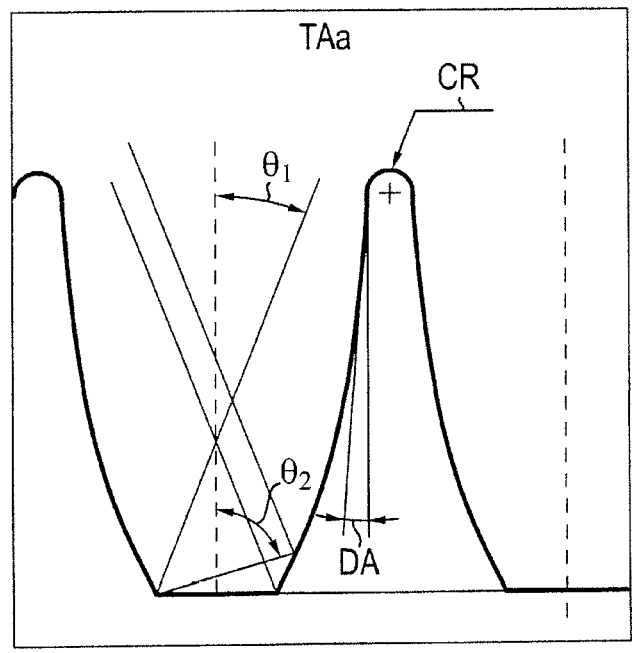
FIG. 8: Transversal view of an adapted angle transformer (TAa) concentrator.

FIG. 8: A transversal view is shown of an exemplary adapted angle transformer (TAa) concentrator with a curvature radius CR and draft angle DA.

Figure 9:
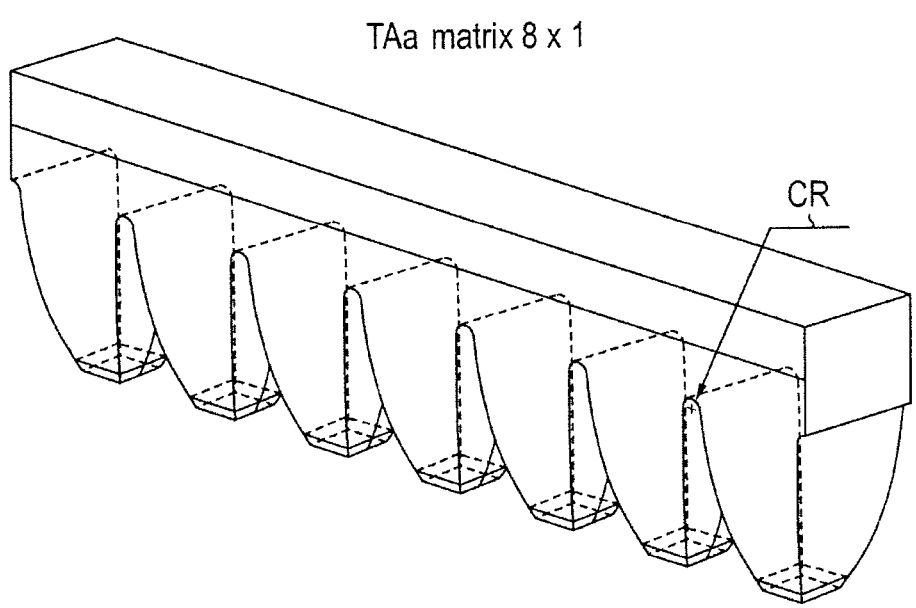
FIG. 9: Perspective view of a matrix of adapted angle transformer (TAa) concentrators.

FIG. 9: A perspective view of an exemplary 8×1 matrix of adapted angle transformer (TAa) concentrators is shown, which has been moulded with curvature radii of CR and draft angles of DA.

For completeness we note it is assumed clear that further configurations, respectively combinations of the optical elements used in the preceding exemplary embodiments are possible as alternative exemplary embodiments of the same inventive concept.

What is claimed is:

1. An apparatus to detect gamma rays, comprising:
a scintillator, a position sensitive photo sensor and at least one scintillation-light-incidence-angle-constraining, SLIAC, element, wherein
the scintillator has a plurality of faces; and
wherein the position sensitive photo sensor is arranged to detect scintillation photons exiting a scintillation photons transparent face of the scintillator, and
wherein at least a portion or the whole of at least one scintillator face is covered with an absorbing layer, which is arranged to absorb scintillation photons created by scintillation events due to the interaction of incoming gamma rays with the scintillator, and
wherein the scintillation-light-incidence-angle-constraining, SLIAC, element is optically coupled between a scintillation photons transparent face of the scintillator and the position sensitive photo sensor and the scintillation-light-incidence-angle-constraining, SLIAC, element is configured to guide the scintillation photons exiting the scintillator towards the position sensitive photo sensor, and
wherein the scintillation-light-incidence-angle-constraining, SLIAC, element restricts the maximum allowed half light acceptance angle for the scintillation light hitting the position sensitive photo sensor to less than 45° and;
wherein the scintillation-light-incidence-angle-constraining, SLIAC, element comprises an array of concentrators, wherein the concentrators are adapted angle transformer with a curvature radius CR and a draft angle DA.

2. An apparatus according to claim 1, wherein the scintillator has a top face, which is the face of entrance of the gamma rays, a bottom face opposite to the top face and a plurality of lateral faces.

3. An apparatus according to claim 2, wherein at least a portion or the whole of all lateral faces of the scintillator are covered with an absorbing layer.

4. An apparatus according to claim 2, wherein at least a portion or the whole of all lateral faces of the scintillator and the bottom face are covered with an absorbing layer, and the scintillation photons transparent face of the scintillator is the top face.

5. An apparatus according to claim 2, wherein at least a portion or the whole of all lateral faces of the scintillator and the top face are covered with an absorbing layer, and the scintillation photons transparent face of the scintillator is the bottom face.

6. An apparatus according to claim 3, wherein the position sensitive photo sensor is optically coupled to the bottom face and a second position sensitive photo sensor is optically coupled to the top face of the scintillator.

7. An apparatus according to claim 1, wherein a faceplate is optically coupled to a face of the scintillator transparent to scintillation photons; and wherein the faceplate allows only scintillation photons with specific incident angles to pass through, or reduces the range of allowed maximum half light acceptance angles for the incident scintillation light to between 19° and 34°.

8. An apparatus according to claim 1, wherein the scintillator has a truncated pyramid shape.

9. An apparatus according to claim 1, wherein the scintillator is at least of one of the types in a list comprising mono crystal and pixelated crystal.

10. An apparatus according to claim 1, wherein the scintillator material is selected from the group consisting of, plastic, ceramic, and glass.

11. An apparatus according to claim 1, wherein the position sensitive photo sensor is selected from the group consisting of, a position sensitive photo sensor array covering the area of a scintillator face transparent to scintillation photons, and a single position sensitive photo sensor covering an area of a scintillator face transparent to scintillation photons; and wherein the type of photo sensor is selected from the group consisting of a silicon based photo multiplier and an avalanche photo diode.

12. An apparatus according to claim 1, wherein a retroreflector is optically coupled to a second scintillation photons transparent face of the scintillator opposite the scintillation photons transparent scintillator face, to which the position sensitive photo sensor is optically coupled.

13. An apparatus according to claim 12, wherein a faceplate is optically coupled between retroreflector and scintillator and wherein the faceplate allows only scintillation photons with specific incident angles to pass through, or reduces the range of allowed maximum half light acceptance angles for the incident scintillation light to between 19° and 34°.

14. A gamma ray detector preserving an original light distribution of scintillation event photons comprising:
a truncated pyramid shaped scintillator having opposing angled lateral faces, a top face, and an opposing bottom face parallel to the top face, said bottom face being transparent to the scintillation event photons;
an absorbing layer placed on at least a portion of the opposing angled lateral faces sufficient to absorb more than 50% of the scintillation event photons;
a photosensor; and
an array of concentrators coupled between the bottom face of said scintillator and said photosensor, each concentrator in said array of concentrators comprising lateral faces having a parabolic surface and a straight flat surface wherein the range of allowed half-light incidence angle of the scintillation event photons is restricted to less than 45° and said array of concentrators guide the scintillation event photons to said photosensor, said array of concentrators having the parabolic surfaces thereof connected together at an apex joining each of said array of concentrators, the apex having a curvature radius and each of said array of concentrators having the parabolic surfaces forming a draft angle extending from the apex towards the straight flat surface,
whereby when radiation enters the top face of said scintillator a combination of said absorbing layer and each concentrator in said array of concentrators restricts the range of allowed half-light incidence angle of the scintillation event photons resulting in decreased dispersion and increasing spatial resolution of the gamma ray detector.

15. A gamma ray detector preserving an original light distribution of scintillation event photons as in claim 14 wherein:
each concentrator in said array of concentrators comprises an angle transformer concentrator.

16. A gamma ray detector preserving an original light distribution of scintillation event photons as in claim 14 wherein:
each concentrator in said array of concentrators comprises an adapted concentrator.

17. A gamma ray detector preserving an original light distribution of scintillation event photons as in claim 14 further comprising:
a faceplate optically coupled to the top face; and
a retroreflector optically coupled to said faceplate.

18. A gamma ray detector preserving an original light distribution of scintillation event photons as in claim 14 wherein:
the allowed half-light incidence angle of the scintillation event photons is between 19° and 34°.

19. A gamma ray detector preserving an original light distribution of scintillation event photons as in claim 14 wherein:
the parabolic surface of each of said concentrators is adjacent the bottom face of said scintillator and the straight flat surface of each of said concentrators is adjacent said photosensor.

20. A gamma ray detector preserving an original light distribution of scintillation event photons comprising:
a truncated pyramid shaped scintillator having opposing angled lateral faces, a top face, and an opposing bottom face parallel to the top face, said bottom face being transparent to the scintillation event photons;
a faceplate placed on the top face of said truncated pyramid;
a retroreflector placed on said faceplate;
an absorbing layer placed on at least a portion of the opposing angled lateral faces sufficient to absorb more than 50% of the scintillation event photons;
a photosensor; and an array of concentrators coupled between the bottom face of said scintillator and said photosensor, each concentrator in said array of concentrators comprising lateral faces having a parabolic surface and a straight flat surface wherein the range of allowed half-light incidence angle of the scintillation event photons is restricted to less than 45° and said array of concentrators guide the scintillation event photons to said photosensor, said array of concentrators having the parabolic surfaces thereof connected together at an apex joining each of said array of concentrators, the apex having a curvature radius and each of said array of concentrators having the parabolic surfaces forming a draft angle extending from the apex to the straight flat surface, a first layer of optical coupling medium placed between said truncated pyramid shaped scintillator and said array of concentrators; and a second layer of optical coupling medium placed between said photosensor and said array of concentrators, whereby when radiation enters the top face of said scintillator a combination of said absorbing layer and each concentrator in said array of concentrators restricts the range of allowed half-light incidence angle of the scintillation event photons resulting in decreased dispersion and increasing spatial resolution of the gamma ray detector.

* * * * *